United States Patent [19]
Niekrasz

[11] Patent Number: 5,838,857
[45] Date of Patent: Nov. 17, 1998

[54] JOINED CHAMBER CONNECTOR

[75] Inventor: Edward J. Niekrasz, Bonita, Calif.

[73] Assignee: Lockheed Martin Corporation, Bethesda, Md.

[21] Appl. No.: 826,705

[22] Filed: Apr. 7, 1997

[51] Int. Cl.$^6$ ............................................. G02B 6/38
[52] U.S. Cl. ........................... 385/56; 385/58; 385/60; 439/139; 439/201
[58] Field of Search .................... 385/56, 58, 60, 385/70, 76, 86, 87; 439/139, 201, 310, 271

[56] References Cited

U.S. PATENT DOCUMENTS

| | | | |
|---|---|---|---|
| 3,491,326 | 1/1970 | Pfister et al. | 339/19 |
| 3,508,188 | 4/1970 | Buck | 339/42 |
| 3,845,450 | 10/1974 | Cole et al. | 339/42 |
| 4,373,767 | 2/1983 | Cairns | 339/94 |
| 4,606,603 | 8/1986 | Cairns | 350/96.21 |
| 4,666,242 | 5/1987 | Cairns | 350/96.21 |
| 4,696,540 | 9/1987 | Adams et al. | 350/96.21 |
| 4,795,359 | 1/1989 | Alcock et al. | 439/271 |
| 4,948,377 | 8/1990 | Cairns | 439/200 |
| 5,194,012 | 3/1993 | Cairns | 439/201 |
| 5,203,805 | 4/1993 | Cairns | 439/199 |
| 5,685,727 | 11/1997 | Cairns | 439/139 |

FOREIGN PATENT DOCUMENTS

| | | |
|---|---|---|
| 2529396 | 12/1983 | France . |
| 2264201 | 8/1993 | United Kingdom . |
| 86 002173 | 4/1986 | WIPO . |

*Primary Examiner*—Phan T. H. Palmer
*Attorney, Agent, or Firm*—Sidley & Austin

[57] ABSTRACT

A connector plug half includes a telescopic cover sleeve which can be pushed by a connector receptacle half during mating to a receded position to thereby deploy radially outward one or more flexible tubes, each having at the ends thereof an optical contact. The telescoping movement opens a dielectric chamber in which the optical contacts are maintained. The connector receptacle half includes one or more optical receptacle contacts in a peripheral dielectric chamber. An internal cover sleeve is telescoped to a receded position in the connector receptacle during mating to thereby join the two dielectric chambers when the optical connection is made. The dielectric chambers remain free of contamination by fluid external to the connector halves.

28 Claims, 5 Drawing Sheets

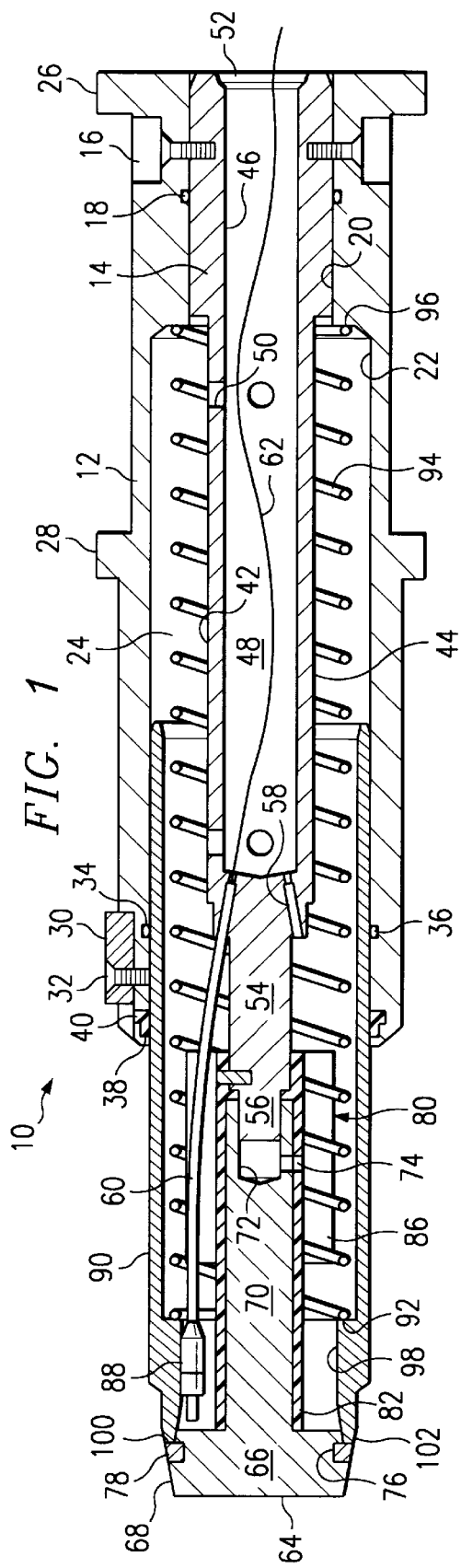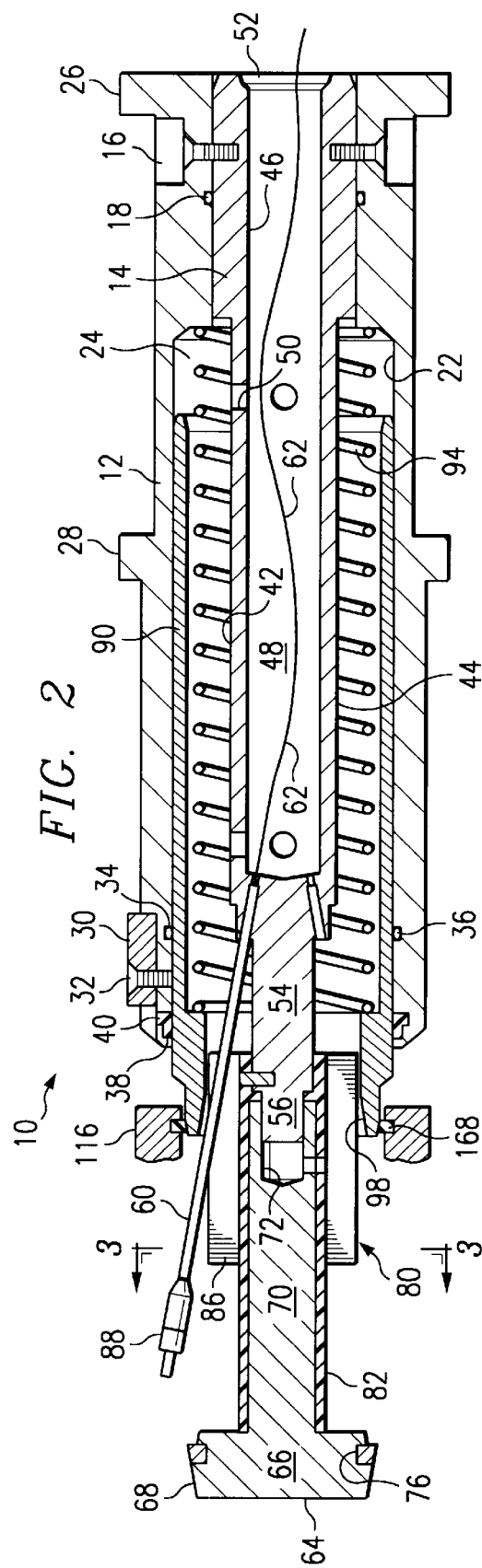

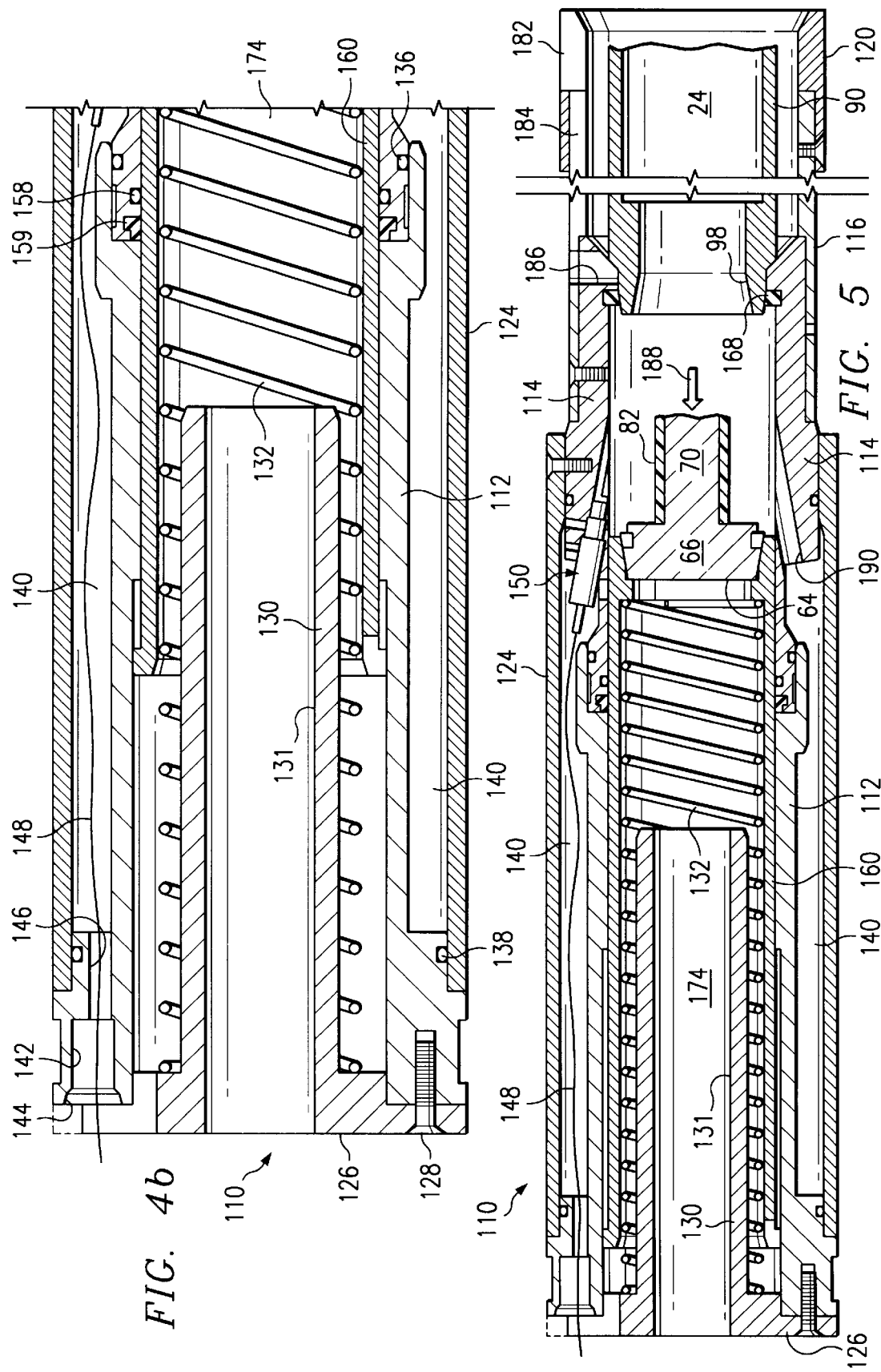

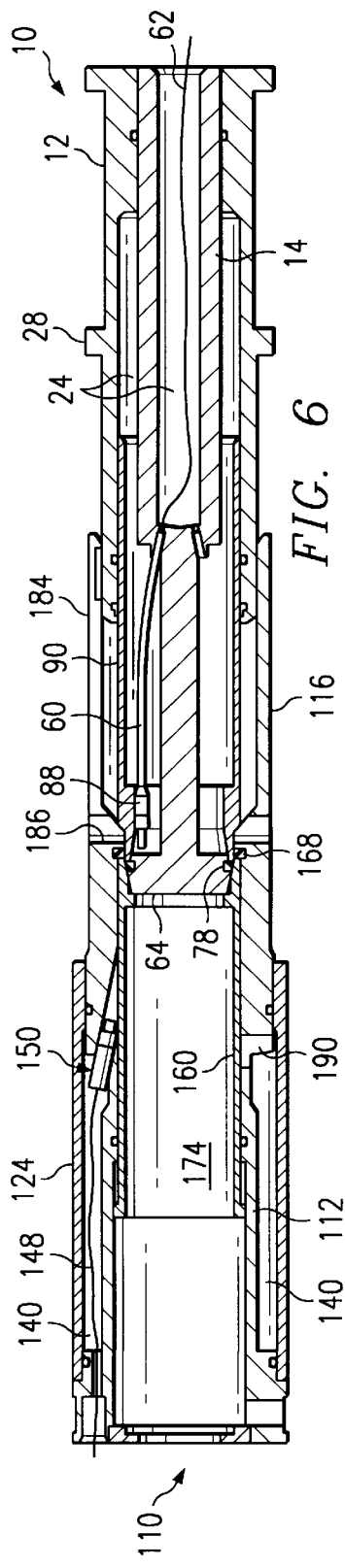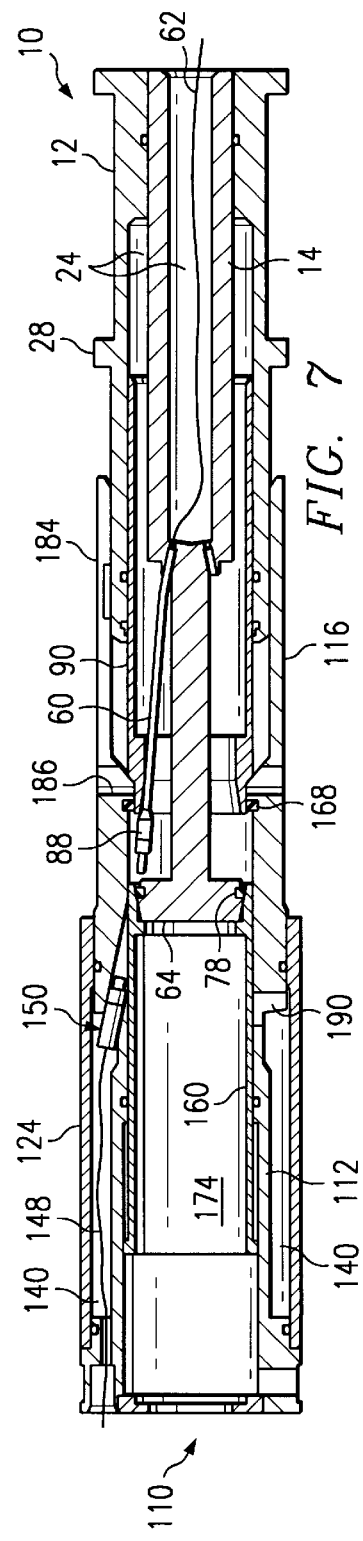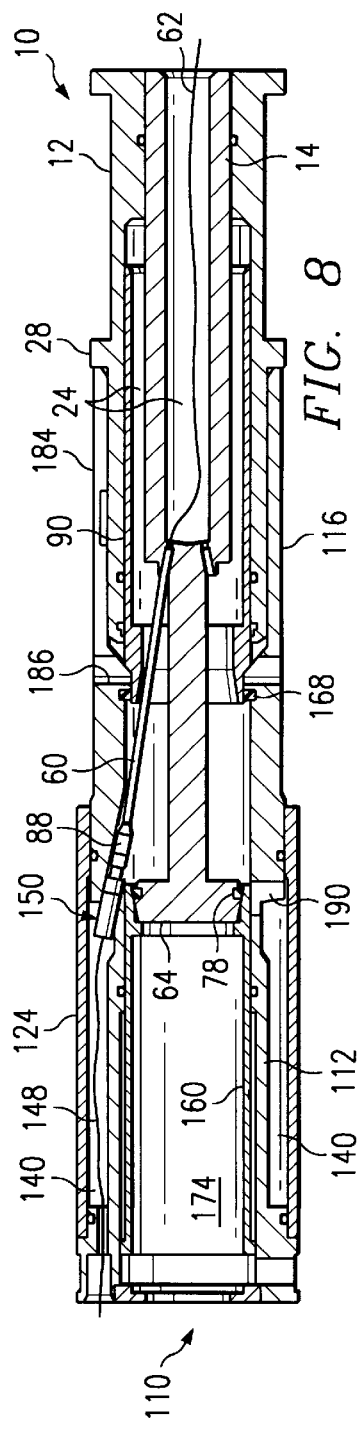

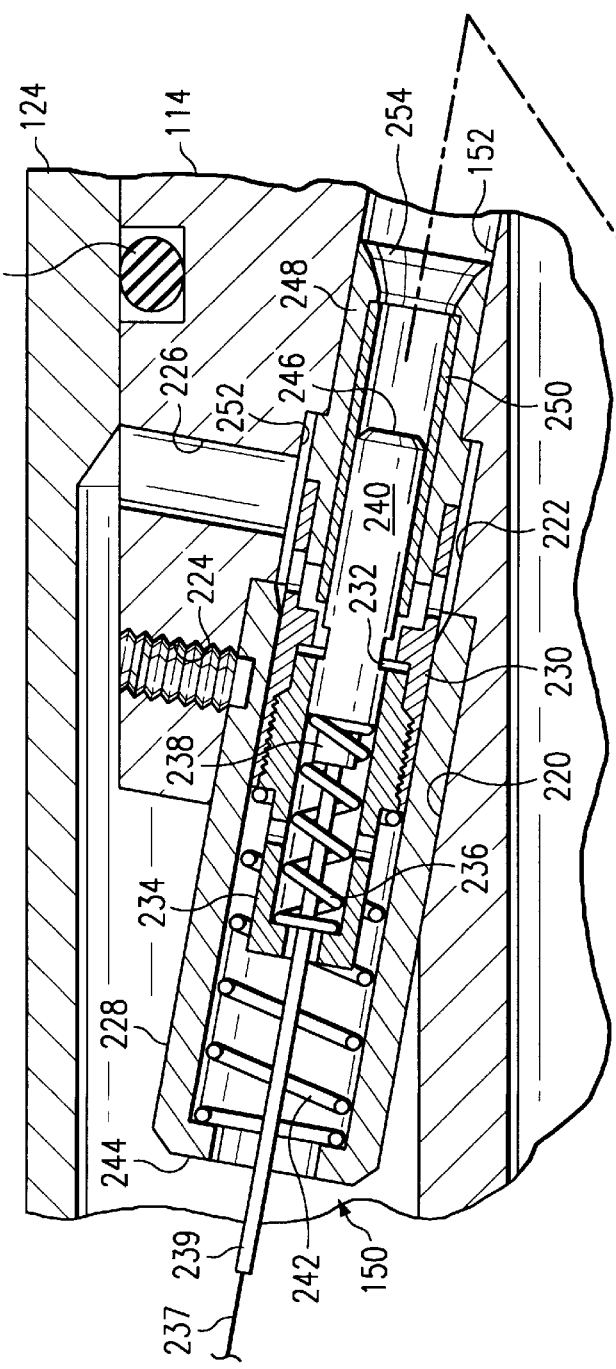
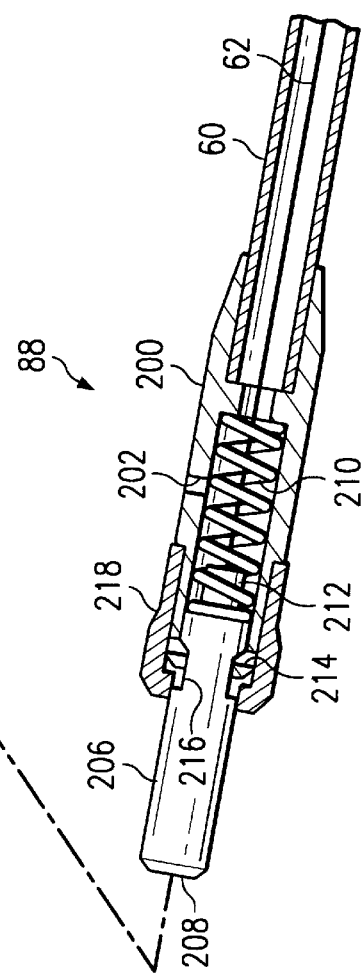
FIG. 9

JOINED CHAMBER CONNECTOR

TECHNICAL FIELD OF THE INVENTION

The present invention relates in general to connectors for joining together signal lines, and more particularly to connectors adapted for mating and demating in underwater applications.

BACKGROUND OF THE INVENTION

The connector technology is well developed for coupling together electrical lines, fiber optic lines and other types of conductors that communicate different signals, including AC and DC power. There exist literally thousands of different types of connectors to fulfill the needs of numerous types of applications. Generally, connectors are constructed as two separable components, typically called a plug connector and a receptacle connector which, when joined, allow the signals and/or power to be communicated from one line to another line. As can be appreciated, long-term reliability of connectorized lines is of paramount importance.

A specialized area has developed for submersible connectors which allow the joining of lines for underwater applications. One type of underwater connector is adapted for mating and demating under dry conditions, but once mated, the joined connection can be immersed in fluids and yet maintain a reliable connection. In another type of underwater connector, the plug and receptacle connector components can be mated or demated while underwater and maintain reliable connections. The latter type of connectors are the most desirable for marine applications, in that the reliability of the connection is independent of whether the connector components are mated in wet or dry situations. Connectors that can be mated under water, known as "wet-mate" connectors, generally include a pressure-compensated, dielectric fluid-filled chamber in the receptacle half of the connector. During mating, the contact probe of the plug connector passes through a penetrable entry seal of the fluid-filled chamber to connect with a receptacle socket contact enclosed within the chamber. The penetrable entry seal maintains a seal to the plug contact probe when mated, to thereby retain the compensating fluid within the chamber. The entry seal recloses when the plug contact probe is removed. The penetrable entry seal tends to "wipe" the plug contact probe so that the sea water, or the like, does not mix with the fluid dielectric contained within the pressure-compensated chamber. Underwater mateable connectors of such design are disclosed in U.S. Pat. Nos. 4,606,603; 4,666,242; 4,373,767; 5,194,012; 5,203,805 and 4,948,377, all by Cairns. Other types of underwater connectors are disclosed in U.S. Pat. Nos. 4,795,359 by Alcock et al.; 4,696,540 by Adams et al.; 3,845,450 by Cole et al.; 3,508,188 by Buck; and 3,491,326 by Pfister et al.

In submersible connectors of the type having penetrable entry seals, such as disclosed in U.S. Pat. No. 4,606,603 by Cairns, the plug and receptacle electrical contacts are bathed in the contained dielectric fluid after being mated. When demated, one connector contact, generally the plug contact probe, is exposed to the external fluid, which is often sea water. While electrical contacts are constructed with materials that can be momentarily exposed to sea water and the like without undue deterioration, optical connections are not so tolerant of the external fluids. When mating the ends of optical fibers, which may have a signal path of only 8–10 microns in diameter, any particle or residue trapped at the optical interface can seriously affect the optical performance. Accordingly, submersible connectors carrying optical signals must be constructed so that each end of the fibers that are to be joined together are never exposed to the external fluid, whether joined or demated.

A family of submersible connectors has been developed, called "joined chamber connectors", that maintains the ends of the lines bathed in a dielectric fluid at all times. Such type of connectors are designed to provide protective, fluid-filled chambers around the contacts of both the plug and receptacle connector halves. The dielectric not only provides the contacts with a protective fluid environment, but also provides a pressure compensating mechanism to enhance reliability in deep sea situations. In some instances, the chamber over the plug contact probe is pushed back and the probe passes through the external fluid, which may be sea water with contaminants, before entering the mating chamber. U.S. Pat. No. 3,491,326 by Pfister, et al, shows such a connector. In other instances, the faces of the two chambers are squeezed together to exclude as much external fluid as possible from the entry seal area. Nevertheless, the plug contact probe must still pass through a minimal volume of the external fluid trapped between the mating chamber faces. Such type of joined chamber connector is disclosed in U.S. Pat. Nos. 3,508,188 by Buck; 3,845,450 by Cole, et al, and 4,696,540 by Adams, et al.

In order to remove external fluid during the mating procedure of joined chamber connectors, fluid purging can be employed to flush the external fluid out of the trapped volume before the final insertion of the plug contact probe into the receptacle connector half. As can be appreciated, the fluid purging technique requires additional equipment, adds to the complexity and cost of the connector by requiring purge fluid reservoirs, pumps, valves and associated plumbing.

From the foregoing, it can be seen that a need exists for an improved joined chamber connector in which plug and receptacle connector halves can be joined without trapping any external fluid that could contaminate or otherwise adversely affect the intimate contact surfaces. Another need exists for an improved joined chamber connector particularly adapted for mating fiber optic circuits and lines that are known to be extremely sensitive to contact contamination. Yet another need exists for a joined chamber connector in which the plug connector contact and the receptacle connector contact are each bathed in a dielectric chamber before mating, and thereafter the mated contacts remain in a common, or joined dielectric-filled chamber. Another need exists for an improved submersible connector of the joined chamber type, in which the volume of the dielectric chamber does not substantially change before, during or after the mating procedure, i.e., a constant volume submersible connector.

SUMMARY OF THE INVENTION

In accordance with the principles and concepts of the present invention, there is disclosed a joined chamber connector that overcomes the problems and shortcomings of the prior art connectors of such type.

In accordance with an important feature of the invention, plug and receptacle connector halves are constructed so that when joined in underwater conditions, the plug and receptacle contacts, whether they be of the electrical or optical type, are moved toward each other in a dielectric-filled chamber without being exposed to any type of external fluid. In accordance with another feature of the invention, a connector plug half houses an optical contact in a dielectric-filled chamber, a connector receptacle half houses a complementary optical contact in another dielectric-filled chamber, and when the connector halves are joined the dielectric-filled chambers are also joined, without any significant difference or change in the volume of the dielectric chambers.

In accordance with the preferred embodiment of the invention, a connector plug half includes a cylindrical housing body. A cylindrical cover sleeve is made telescopic within the housing body, and is spring biased by a coil spring to a closed position. Anchored at an angle within the housing body at one end thereof are one or more elongate flexible tubes. The other end of each flexible tube is urged radially inwardly from a rest position and contained by the telescopic cover sleeve. In its rest or relaxed state, the telescopic cover sleeve of the connector plug half maintains a seal between the housing body and a frontal end plate, to thereby maintain the contacts at the ends of the respective flexible tubes contained within a dielectric-filled chamber. When the connector plug half is joined to the connector receptacle half and the components pushed together, the telescopic cover sleeve is forced to a receded position within the plug housing body, thereby allowing the flexible tubes and associated contacts to splay outwardly in a radial direction. Upon further engagement of the connector halves, the contacts of the connector plug join with the complementary contacts of the connector receptacle, which are located in the peripheral portion of the connector receptacle.

In accordance with the preferred form of the invention, the connector receptacle half is structured to receive the connector plug half in underwater conditions. The connector receptacle half includes a cylindrical housing body, also with a spring-biased telescopic internal cover sleeve. In its relaxed or rest state, the telescopic internal cover sleeve maintains one or more of the complementary contacts located in the peripheral portion of the receptacle housing body within a dielectric-filled chamber. As the connector plug half is initially joined to the connector receptacle half, the frontal end cap of the connector plug intimately seals to the internal cover sleeve of the receptacle, thereby eliminating any trapped external fluid, and creating a barrier between the plug and receptacle connector halves. As the connector plug half is moved forwardly into the connector receptacle half, the telescopic internal cover sleeve of the connector receptacle half begins receding into the receptacle housing body. In like manner, the telescopic outer cover sleeve beings receding into the housing body of the connector plug half. As the mating process proceeds, the dielectric-fluid chamber housing the receptacle complementary contact joins the chamber housing the plug contact, thereby achieving a connection without either contact being exposed to the external fluid. In addition, there is neither a significant increase nor decrease in the volume of the chambers before, during or after the mating of the contacts.

In accordance with the preferred embodiment, the dielectric-filled chambers of both the connector plug and receptacle halves are compensated so that pressure and temperature changes do not adversely affect the connectors.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or elements throughout the views, and in which:

FIG. 1 is a cross-sectional view illustrating the structural details of the connector plug half;

FIG. 2 is a cross-sectional view of the connector plug half, illustrating the telescopic cover sleeve forced to its retracted position, thereby allowing the free end of the flexible tubes and associated contacts to splay outwardly;

FIGS. 4a and 4b, when joined together, are cross-sectional views illustrating the structural details of the connector receptacle half;

FIG. 5 is a cross-sectional view of the connector receptacle half and a portion of the connector plug half, illustrating the joined chambers thereof;

FIGS. 6–8 are cross-sectional views of simplified forms of the plug and receptacle connectors constructed according to the invention, illustrating the different stages of mating the plug and receptacle halves together so as to join separate dielectric-filled chambers into a single chamber; and FIG. 9 is a partial cross-sectional and enlarged view of the fiber optic contact apparatus that provides a precision and accurate mating between the ends of the fiber optic lines.

DETAILED DESCRIPTION OF THE INVENTION

Figure 3:
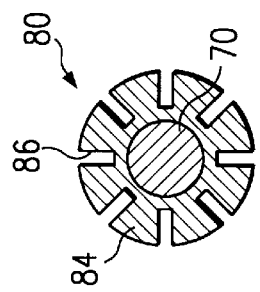
FIG. 3 is a cross-sectional view of a flexible tube guide structure, taken along line 3–3 of FIG. 2.

With reference now to FIG. 1, there are shown the structural features of the connector plug half 10 constructed according to the preferred embodiment of the invention. While the joined chamber plug and receptacle connectors described below are structured to couple together the ends of optical fibers, the invention can be utilized with equal effectiveness in conjunction with lines and contacts carrying electrical signals, or a mixture of both optical and electrical contacts.

The connector plug 10 includes a housing constructed as an outer body 12 fixed to an inner body 14. The housing parts are preferably machined from titanium stock, and anodized to provide a protective coating. The outer body 12 and inner body 14 are generally of a cylindrical shape, and are fastened together during assembly by plural screws, shown as reference numeral 16. Moreover, the inner body 14 is sealed to the outer body 12 by way of a resilient O-ring 18. Formed within the outer body 12 is a first axial bore 20 for supporting therein the inner body 14. A second axial bore 22 is of a diameter larger than the first bore 20 and defines a chamber 24 for containing a dielectric fluid, such as a silicone oil having a viscosity of about 100 centistoke. Formed on the external annular surface at the rear end of the outer body 12 is an annular rim 26. A second annular rim 28, defining a stop, is formed somewhat centrally on the outer body 12. As will be described more fully below, the stop 28 engages with a portion of the connector receptacle shown in FIGS. 4a and 4b, during mating of the connector halves. The cylindrical area between the rims 26 and 28 can be used as a hand grip during mating and demating of the connector halves. In order to provide angular registration between the plug and receptacle connectors, a key 30 is fastened by a screw 32 in the frontal portion of the outer body 12. Also formed in the internal bore 22 of the outer body 12 is an annular groove 34 for supporting an O-ring 36. A frontal groove 38 formed annularly in the bore 22 is structured to support a scraper ring 40.

With regard to the inner body 14, the outer cylindrical surface is machined along a portion thereof to provide opposing flat surfaces 42 and 44. The elongate flat surfaces 42 and 44 allow movement of the dielectric fluid between the inner and outer body, despite other connector parts disposed therebetween. An axial, central bore 46 is formed in the inner body 14 to define a cavity 48. The cavity 48 is in fluid communication with the dielectric chamber 24 by way of numerous side wall ports, one shown as reference numeral 50. The axial bore 46 extends to the back end of the inner body 14, and includes a hydraulic fitting port 52 for attachment to a hose or cable connection (not shown) for allowing a fluid-tight connection between the connector plug 10 and equipment carrying the signal lines.

Located at the frontal part of the inner body 14 is a shaft 54 having a threaded end 56. A number of angled holes 58 are drilled at the base of the shaft 54, each to support a flexible tube 60. The angle at which the holes 58 are drilled, with respect to a longitudinal axis of the connector, is about 10°. The angled holes 58 are formed in a stepped manner to prevent the flexible tube 60 from entering within the central cavity 48 of the inner body 14. The base of each flexible tube 60 is bonded within a respective angled bore 58. Preferably, the flexible tubes 60 are constructed of a stainless steel material having a length of about 4.5 inches, an outside diameter of about 0.095 inches and an inside diameter of about 0.070 inch. As can be appreciated, the tubes 60 are themselves made of a rigid material such as stainless steel, but due to the length and diameter thereof, such tubes can be deformed to a certain extent without incurring a permanent bend. The flexible tube 60 carries therein a signal line 62 which passes through the internal cavity 48 of the inner body 14. Any unused angled bore 58 functions as a fluid port for allowing passage of the dielectric between the chamber 24 and the central cavity 48.

The inner body 14 of the connector plug 10 is fixed, and immovable with regard to the outer body 12. Threadably fastened to the inner body shaft 54 is a frontal end cap 64. The end cap is constructed as a circular plug 66 having an exterior annular taper 68, and a shaft portion 70 that is threadably fastened to the shaft 54 of the inner body 14. As will be described below, the end cap 64 of the connector plug 10 functions as a plunger that is sealed to the connector receptacle for forcing the external fluid out of a central portion thereof. A threaded bore 72 of the frontal end cap shaft 70 includes a transverse port 74 in communication with the dielectric chamber 24. An annular groove 76 is formed in the annular beveled surface 68 of the plug 66 to thereby support therein an elastomeric seal ring 78. The seal ring 78 can be fabricated of an ethylene rubber, fluorosilicone material, natural rubber or other type of high quality material that is compatible with external fluids as well as dielectric fluids contained within the plug connector 10. As can be appreciated, the frontal end cap 64 is immovable with respect to the outer body 12.

Fastened to the shaft 54 of the inner body 14, and surrounding the shaft 70 of the forward end cap 64, is a slotted tube guide 80. The slotted tube guide 80 is shown in detail in FIG. 3. The slotted tube guide 80 includes a sleeve portion 82 and a slotted portion 84 having a plurality of slots 86. Each slot 86 can freely accommodate a flexible tube 60 therein. As noted in FIG. 3, the slotted tube guide 80 is machined to accommodate a total of eight flexible tubes 60. However, the slotted tube guide 80 can be fabricated to accommodate as many flexible tubes 60 as required by the particular connector plug 10. The slots 86 function to provide lateral stability and support to the flexible tubes 60 so as to maintain an optical plug contact 88, as attached to the end of the flexible tube 60, aligned along a desired path. The optical plug contact 88 is maintained in a path so as to be guided into a corresponding optical receptacle contact located in a peripheral dielectric chamber of the connector receptacle half.

A cylindrical-shaped external cover sleeve 90 is telescopic within the bore 22 of the outer body 12. When the external cover sleeve 90 is in the position shown in FIG. 1, the dielectric fluid chamber 24 is contained and isolated within the connector plug half 10. However, when the external cover sleeve 90 is telescopically moved to the position shown in FIG. 2, the dielectric chamber 24 is opened, and the optical plug contact 88 is deployed radially outwardly. The telescopic movement of the external cover sleeve 90 occurs only when the connector plug is pushed and sealed within the connector receptacle.

The telescopic cover sleeve 90 is provided with a fluid seal to the internal bore 22 of the outer body 12 by way of an O-ring 36. Moreover, the scraper ring 40 is effective to remove dirt, particles, residue and other debris from the outer smooth surface of the telescopic cover sleeve 90. By cleaning the outer smooth surface of the telescopic cover sleeve 90, the O-ring 36 can provide a reliable and long-lasting fluid seal to the internal side wall of the outer body 12. The scrapper ring 40 can be constructed of a hard polyurethane or other suitable material, such as utilized in the manufacture of standard hydraulic cylinders. The frontal portion of the telescopic cover sleeve 90 includes and internal annular shoulder 92 against which a coil or helical spring 94 abuts. The other end of the coil spring 94 abuts against an end surface 96 formed in the internal surface 22 of the outer body 12. Thus, the telescopic cover sleeve 90 is spring biased in a direction to close and seal the internal fluid chamber 24. The springs employed in the connector halves can be made of an Inconel 625 material, or other suitable metal.

The frontal portion of the telescopic cover sleeve 90 also includes an annular area that flares radially outwardly to provide a bow-shaped surface 98. The surface 98 engages with the optical plug contact 88 in the position shown in FIG. 1, as well as with the flexible tube 60 as shown in FIG. 2. A frontal annular edge 100 of the external cover sleeve 90 abuts against and seals with the seal ring 78 that is fixed to the forward end cap 64 of the inner body 14. As will be described in more detail below, a tapered external surface 102 formed on the end of the external cover sleeve 90 is effective to form a seal with the connector receptacle half as the connector plug half 10 is pushed therein.

As noted above, FIG. 2 illustrates the deployment of the free end of the flexible tube 60 and the associated optical plug connector 88. As can be visualized, as the telescopic cover sleeve 90 is forced back into the outer body 12, the flexible tube 60 moves from an inwardly deformed position shown in FIG. 1, to a relaxed position shown in FIG. 2. The telescopic cover sleeve 90 is moved into the outer body 12 against the tension of the coil spring 94, due to engagement with the connector receptacle parts shown in broken lines and by reference characters 116 and 168. The length of the flexible tube 60 is such that when in the deformed condition shown in FIG. 1, the tube 60 is not permanently bent. The inherent flexibility of the tube 60 allows the free end thereof to spring outwardly, as guided by the respective slot 86 in the slotted tube guide 80. The deployment of the flexible tube 60 makes the optical plug contact 88 accessible for connection to an optical receptacle contact housed within the connector receptacle half.

Figure 4A:
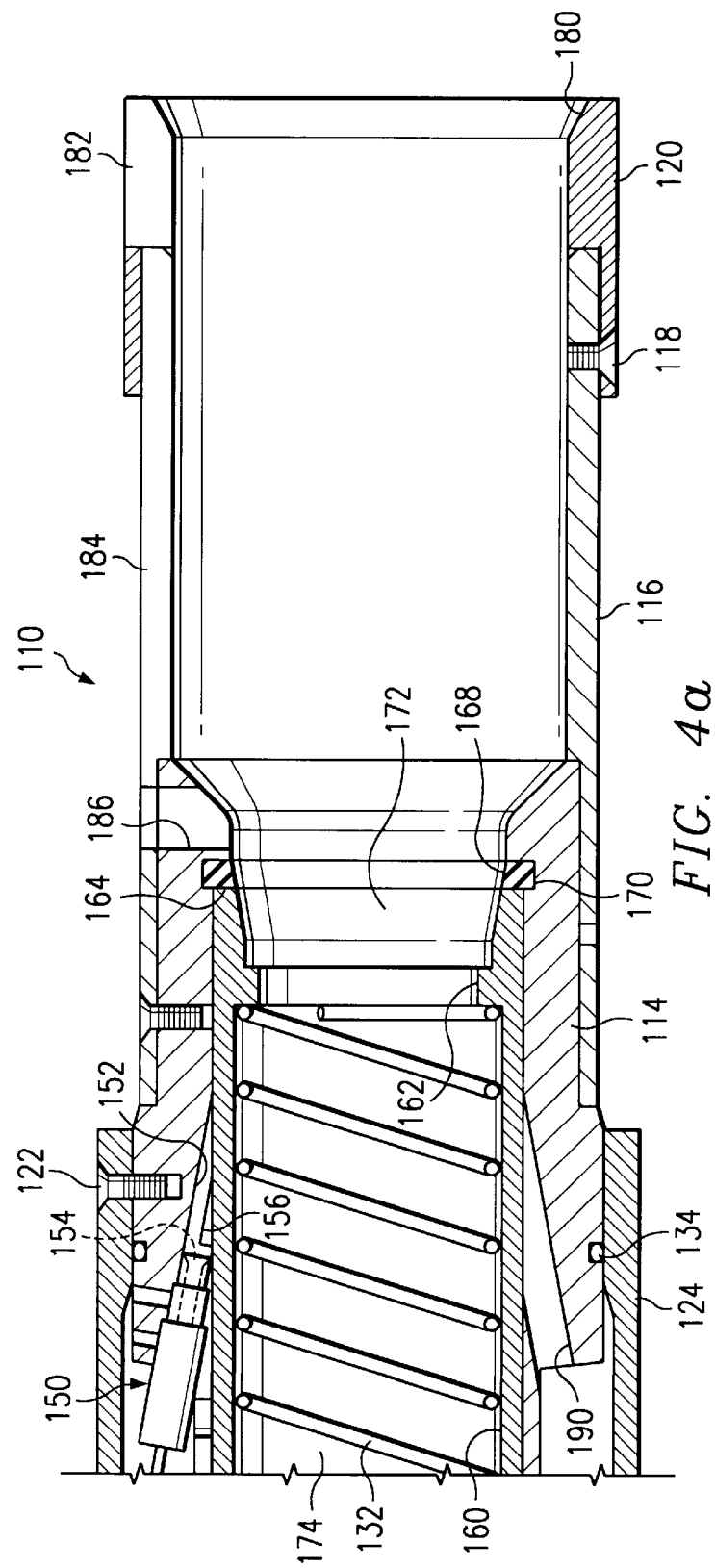

FIGS. 4a and 4b, when joined together, illustrate the receptacle portion of the connector, constructed according to the preferred embodiment of the invention. The connector receptacle 110 includes a rear inner body 112, a mid-body 114 and a frontal receptacle shell 116. Such parts are constructed in general cylindrical shapes from a titanium material that is anodized to provide a protective surface coating. Fastened by a screw 118 to the frontal receptacle shell 116 is a support ring 120. Fixed by screws 122 to the mid-body 114 is an outer cover sleeve 124. An end plate 126 is fixed to the rear end of the rear inner body 112 by a number of screws 128. The end cap 126 has formed integral therewith a tubular guide 130, around which a coil spring 132 is disposed. The spring guide 130 prevents significant lateral movement of the coil spring 132 during compression thereof.

With regard to the fixed parts of the connector receptacle 110, an O-ring 134 provides a seal between the mid-body 114 and the outer cover sleeve 124. Another O-ring 136 provides a seal between the mid-body 114 and the rear inner body 112. Lastly, an O-ring 138 provides a seal between the rear portion of the inner body 112 and the outer cover sleeve 124. A cavity 140 between the outer cover sleeve 124 and the rear inner body 112 defines an annular-shaped chamber filled with a dielectric fluid, such as a silicone oil.

With regard to FIG. 4b, the rear inner body 112 has a large off-center bore 142 for a hydraulic hose fitting (not shown) that engages with an opening 144 to the bore 142. A second, smaller-diameter bore 146 provides a channel between the bore 142 and the dielectric chamber 140. As can be seen in FIG. 4b, an optical fiber 148 is carried through the dielectric chamber 140. The optical fiber 148 is coupled to an optical receptacle assembly 150 (FIG. 4a). The optical receptacle assembly 150 is secured within an angled bore 152 of the mid-body 114. The optical receptacle assembly 150 includes an inlet 154 for receiving therein the deployed optical plug contact 88, shown in FIG. 2. The angled bore 152 formed in the mid-body 114 opens into the internal cylindrical surface thereof as an elongate oval opening. This allows guidance of the optical plug contact 88 into the optical receptacle assembly 150. Further, the internal surface of the mid-body 114 is machined to form an annular slanted groove 156. The slanted groove 156 also facilitates the guidance and mating of the optical contacts. The plug and receptacle parts of the optical contacts are described below in more detail in connection with FIG. 9.

The movable parts of the receptacle connector half 110 comprise telescopic internal cover sleeve 160. The frontal portion of the internal cover sleeve 160 is machined to include an internal annular shoulder 162, against which the coil spring 132 abuts. The coil spring 132 urges a frontal annular edge 164 of the internal cover sleeve 160 against an elastomeric seal ring 168. The seal ring 168 is nested within an annular channel formed in the frontal receptacle shell 116. When the plug and receptacle portions of the connector halves are mated, the angled surface of the elastomeric seal 168 seals to the outer beveled surface 102 of the telescopic cover sleeve 90 associated with the connector plug half 10.

The internal cover sleeve of the connector receptacle 110 is sealed to the mid-body 114 by an O-ring seal 158. A scraper ring 159, held in an internal groove in the mid-body 114, is effective to clean the outer polished surface of the internal cover sleeve 160. It is noted the sea water and particles suspended therein are free to flow into the cavity 174, in which the coil spring 132 is disposed.

In accordance with an important feature of the invention, the internal, annular surface 172 of the internal cover sleeve 160 is tapered at exactly the same angle as the external tapered edge 68 of the end cap plug 64 associated with the connector plug half 10. With identical mating surfaces 172 and 68, substantially no external fluid is trapped therebetween. Moreover, the seal ring 78 encircling the frontal end cap 64 of the connector plug provides a fluid seal to the inside taper 172 of the internal cover sleeve 160. As can be appreciated, the central cavity 174 within the internal cover sleeve 160 is in communication with the external fluid, such as sea water. The internal bore 131 of the spring guide 130 opens to the exterior of the connector receptacle half 110 and thus allows sea water to enter into the connector volume containing the coil spring 132. Indeed, when not mated with a connector plug half 10, sea water or the like, can flow entirely through the central cavity 174 of the connector receptacle half 110.

FIG. 5 illustrates the mating of the connector plug and receptacle halves, such that the respective dielectric chambers 24 and 140 join together as one chamber, and the optical plug and receptacle contacts remain in the dielectric fluid during the mating operation to thereby provide a reliable and high-quality fiber optic interface to couple the optical signals.

The frontal portion of the connector plug half 10 is loosely inserted into the support ring 120 of the connector receptacle half 110, aided by an internal bevel 180. The connector plug half 10 is rotated such that the key 30 slides within the angled entry portion 182 of the support ring 120. Upon further insertion of the connector plug 10, the key 30 slides within the keyway 184 of the frontal receptacle shell 116. Finally, the frontal end cap 64 of the connector plug 10 engages within the internal cover sleeve 160 of the connector receptacle 110. The internal cover sleeve 160 is then sealed to the outer annular beveled edge 68 of the frontal end cap 64. It should be noted that during entry of the connector plug 10 into the frontal receptacle shell 116, the external fluid in the connector receptacle 110 is forced out of the port 186, thereby allowing easy mating of the components without hydraulic resistance. It is also noted that during this initial contact mating of the connector plug and receptacle, the seal ring 168 of the receptacle 110 forms a seal to the frontal outer surface 102 of the telescopic cover sleeve 90.

Upon further forced entry of the connector plug 10 into the receptacle 110, the telescopic cover sleeve 90 is stopped by its abutment with the seal ring 168 and thus begins to retract in the connector plug 10 into the dielectric chamber 24 of the outer body 12. This retraction of the telescopic cover sleeve 90 into the connector body forms a frontal opening in the dielectric chamber 24. However, by way of the various seals, the external fluid cannot enter the connector plug chamber 24. As the connector plug 10 is forced further into the connector receptacle 110, the movement of the forward end cap 64 forces the internal cover sleeve 160 of the connector receptacle 110 in a direction compressing the coil spring 132. The direction of movement of the frontal end cap 64 is shown by the arrow 188 of FIG. 5. The movement of the internal cover sleeve 160 by the connector plug end cap 64 in the direction shown by the arrow 188 reduces the volume in the external fluid cavity 174, whereby the sea water is pushed out of the connector receptacle. In this manner, the connector plug end cap 64 functions as a plunger to clear a path in the connector receptacle 110 and remove the external fluid.

During further movement of the connector plug 10, the internal cover sleeve 160 recedes further into the connector receptacle 110 and the connector plug chamber 24 joins with the connector receptacle chamber 140 via the dielectric fluid passage port 190. The dielectric fluid port 190 is significantly larger than the passage for the dielectric fluid through the optical receptacle assembly 150. As noted above, both chambers are filled with a silicone oil to provide a protective dielectric fluid in which the optical connection components are bathed, and to provide an interface environment between the optical components that is free of particles and other contaminants that could otherwise deteriorate the coupling of optical signals. During the entry movement of the connector plug 10 into the connector receptacle 110, the flexible tubes 60 splay outwardly, as shown in FIG. 2, such that the optical plug contact 88 is guided into the optical receptacle assembly 150.

FIGS. 6–8 illustrate a generalized connector plug and receptacle of the invention during various stages of the mating sequence. With reference to FIG. 6, there is illustrated the position of the connector components once initial contact is made between the internal cover sleeve 160 of the connector receptacle 110 and the frontal end cap 64 of the connector plug 10. As can be seen, the fluid purge port 186 formed in the frontal receptacle shell 116 is sealed by the engagement of the telescopic cover sleeve 90 with the seal ring 168 of the connector receptacle 110. The dielectric chamber 24 of the connector plug 10 and the dielectric chamber 140 of the connector receptacle 110 remain as distinct cavities at this stage of the mating sequence. Also, the external fluid in the central cavity 174 of the connector receptacle 110 is contained at the frontal end by virtue of the seal between the internal cover sleeve 160 and the seal ring 78 carried by the tapered surface 68 of the connector plug end cap 64.

With reference to FIG. 7, it can be seen that as the connector plug 10 continues to be joined with the connector receptacle 110, three things happen. First, the telescopic cover sleeve 90 remains stationary with respect to the connector receptacle 110 as the connector plug 10 continues to be pushed into the connector receptacle 110. The telescopic cover sleeve 90 recedes internally into the outer body 12 of the connector plug 10 and compresses the coil spring 94. Secondly, the internal cover sleeve 160 of the connector receptacle 110 is forced by the connector plug end cap 64 to a receded position in the connector receptacle 110, thereby compressing the coil spring 132. This effectively reduces the volume of the central cavity 174 filled with the external fluid. Thirdly, the flexible tubes 60 and associated optical plug contacts 88 begin to deploy radially outwardly. At this stage of the mating sequence, the dielectric chambers 24 and 140 remain separately sealed as to each other, and as to the central cavity 174 that contains sea water.

It is also significant to note that even though the connector plug end cap 64 displaces external fluid in the connector receptacle 110, the volume of the dielectric chamber 24 does not substantially change. The reason for this is that even though a larger volume is generated around the area of the optical plug contacts 88, a greater volume of the telescopic cover sleeve 90 is displaced within the dielectric chamber 24 of the connector plug body 12. Thus, as additional volume is created in one portion of the dielectric chamber 24, less volume is created in another portion of the chamber. Thus, there is no net change in the volume of the dielectric fluid chamber 24 during engagement of the connector components.

With regard to FIG. 8, the connector plug 10 is shown completely joined with the connector receptacle 110. In this condition, the dielectric chamber 140 of the connector receptacle 110 is joined with the dielectric chamber 24 of the connector plug 10, by virtue of the fluid passage port 190 and the small passages in the optical receptacle assembly 150. Also, the optical receptacle assembly 150 is bathed in the dielectric fluid and the optical plug contact 88 remains in the dielectric fluid, thereby providing an optical connection with components that remain in the dielectric fluid at all times. As an alternative to the dielectric fluid passage 190, a passage for the dielectric fluid could be formed adjacent or around the optical receptacle assembly 150. At this stage of the mating sequence, the optical plug contact 88 is fully seated within the optical receptacle assembly 150, thereby providing an optical interface between the fibers that is free of contaminants.

The de-mating of the connector plug 10 and receptacle 110 is carried out by removing the plug 10 from the receptacle 110. The reverse of the operations described above is carried out such that the internal cover sleeve 160 is moved to the right. Also, the flexible tubes 60 begin to be deformed radially inwardly by the engagement therewith of the internal surface 98 of the telescopic cover sleeve 90. Further removal of the connector plug 10, such as shown in FIG. 7, results in the separation of the joined chambers into distinct dielectric chambers 140 and 24. With regard to FIG. 6, the position of the connector components illustrates that the dielectric chamber 140 is completely sealed in the connector receptacle 110 from the sea water cavity 174. Moreover, the dielectric chamber 24 of the connector plug 10 is sealed to thereby contain the optical plug contact 88 in the uncontaminated dielectric fluid. Further movement of the connector plug 10 allows the connector plug 10 to be completely removed from the receptacle 110.

With reference now to FIG. 9, there is illustrated a much enlarged cross-sectional view of the optical plug contact 88 and the optical receptacle assembly 150. The optical plug contact 88 includes a stainless steel adapter sleeve 200 bonded by an adhesive to the stainless steel flexible tube 60. The adapter sleeve 200 has formed in the side wall thereof a port 202 for allowing passage therethrough of the dielectric fluid. An optical fiber 62 is assembled in conjunction with a conventional tungsten carbide or ceramic optical ferrule 206 so that the polished end of the fiber 62 is adjacent the optical face 208 of the ferrule 206. The optical fiber 62 is centered and otherwise supported within the ferrule 206 in a standard and well known manner. A coil spring 210 is disposed within the adapter sleeve 200, and engaged around a post 212 formed integral at the back end of the ferrule 206. The spring 210 applies a pressure on the ferrule 206 of about 1–2 pounds. A C-shaped ring 214 is clipped around a thinned portion 216 of the ferrule 206. A stainless steel adapter cap 218 shaped to cover the C-ring 214 is bonded by an adhesive to the adapter sleeve 200. The adapter cap 218 permanently retains the C-ring 214 engaged around the thinned portion of the optical ferrule 206. Because the axial dimension of the ferrule thinned area 216 is longer than the thickness of the C-ring 214, the ferrule body 206 is allowed a certain degree of axial and angular movement. The spring 210 functions to maintain the optical interface 208 of the ferrule 206 in intimate contact with a corresponding ferrule interface of the optical receptacle assembly 150. The optical interface 208 of the ferrule 206 is somewhat crowned or convex. During intimate contact between the optical interfaces of the coupled ferrules, the glass surfaces undergo a slight elastic deformation to provide a high quality optical coupling of signals.

With reference to the optical receptacle assembly 150 of FIG. 9, it is noted that such assembly is supported at an angle of about 10° in the mid-body 114 of the connector receptacle half 110. A triple stepped bore is formed in the mid-body 114 to support the receptacle assembly 150 therein. A large diameter bore 220 is formed coaxial with an intermediate bore 222 and a smaller diameter bore 152. A threaded hole 224 is formed in the mid-body 114, transverse to the larger diameter bore 220. A fluid passage port 226 is formed in the mid-body 114 transverse to the intermediate-diameter bore 222.

In accordance with the preferred form of the invention, the optical receptacle assembly 150 includes a stainless steel retainer 228 that is slip fit within the larger-diameter bore 220 and secured by way of a set screw engaging a flat surface on the retainer side wall. Housed within the retainer 228 is a stainless steel holder 230 that captures a C-ring 232 between a shoulder thereof, and an annular end of a stainless steel nut 234. The nut 234 is treaded into the holder 230, and the holder 230 is slideable within the retainer 228. The nut 234 is generally hollow and houses a first spring 236 engaged around a post 238 of a ferrule 240. The spring applies about 1–2 pounds of pressure on the ferrule 240. Side wall ports are formed in the nut 234 for freely allowing the dielectric fluid to flow therein. The ferrule 240 is of standard design having a thinned region allowing a certain degree of axial and angular movement with regard to the C-ring 232. A second coil spring 242 is disposed within the retainer 228 and is captured between the end wall 244 thereof at one end, and the edge of the holder 230 at the other end.

An optical fiber 148 is supported by a bifurcation tubing 239. The end of the tubing 239 is epoxied into the ferrule 240.

With the foregoing arrangement, the ferrule assembly, including the ferrule 240, the nut 234 and the holder 230 are spring biased forwardly by the spring 242. As noted above, when the connector halves are joined, the ferrule 240 includes an optical interface 246 that is in intimate contact with the optical interface 208 of the optical plug contact 88. Each ferrule 206 and 240 is thus spring biased against each other to achieve a certain degree of elastic deformation of the interface surfaces and provide a high-quality, physical contact between the end faces of the optical fibers 148 and 62.

A stainless steel end cap 248 and a ceramic split sleeve 250 are situated in the angled bore 152 formed in the mid-body 114. An annular channel area 252 exists around a portion of the end cap 248 to provide a flow of dielectric fluid around the ferrule 240. The end of the end cap 248 has a flared entry 254 providing guidance of the optical plug ferrule 206 therein.

It is noted that the optical receptacle assembly 150 includes dual coil springs. While the coil spring 236 applies a force of about 1–2 pounds on the ferrule 240, the other coil spring 242 is selected with a higher spring force. The spring 242 and the associated components assure that a force of no more than about 1–2 pounds is exerted between the faces 208 and 246 of the optical ferrules 206 and 240. This is due to the forces exerted on the optical ferrules 206 and 240 by the respective coil springs 210 and 236. For example, when inserting the optical plug contact 88 into the optical receptacle assembly 150, the ferrules 206 and 240 experience about 1–2 pounds of force at the interface, whereby the faces experience an elastic deformation sufficient for optimum transfer of optical signals. If the optical plug contact 88 is pushed into the receptacle assembly 150 with a force 20 greater than necessary, the frontal edge of the adapter cap 218 engages with the flared opening 254 of the end cap 248, thereby forcing the ferrule 240 and the associated components of the assembly into the retainer 228, against the force of the third coil spring 242. This arrangement thus assures that the optical faces 208 and 246 of the ferrules 206 and 240 do not experience forces therebetween that could compromise the quality of optical coupling therebetween.

The ceramic split sleeve 250 is of standard design, including an axial slit in the side wall. The ferrule 240 is interference fit within the split sleeve 250, as is the ferrule 206 of the optical plug contact 88. With a precision interface fit between the split sleeve 250 and the ferrules, and both ferrules being spring biased against each other, a precision optical interface is provided.

From the foregoing, disclosed is a wetmate connector of the joined chamber type, in which the signal contacts remain in a protective dielectric medium before, during and after mating and demating. Elaborate dielectric fluid make-up techniques are not necessary, as the volume of the dielectric chambers does not substantially change during mating and demating of the connector halves. The engagement of the signal contacts is carried out by movement of the telescopic cover sleeve of the connector plug that allows a flexible tube to splay radially outwardly. The flexible tube has fixed at the free end thereof a signal contact that mates with a complementary contact housed in a peripheral portion of the connector receptacle half.

While the preferred embodiment of the invention has been disclosed with reference to specific wetmate connector apparatus, and methods of manufacture and operation thereof, it is to be understood that many changes in detail may be made as a matter of engineering choices, without departing from the spirit and scope of the invention, as defined by the appended claims.

What is claimed is:

1. A joined chamber connector, comprising:
    a first connector half carrying a signal line, said first connector half being adapted for engaging with a second connector half carrying a signal line;
    a dielectric chamber housed within each said connector half, each said dielectric chamber having an opening sealed by a movable member;
    at least one pair of contacts, each contact being coupled to one said signal line and disposed in a dielectric chamber of a respective said connector half; and
    said connector halves being constructed such that when joined together, said movable members are moved so as to provide a fluid passage between said dielectric chambers, and said pair of contacts are mated in a dielectric fluid.

2. The joined chamber connector of claim 1, wherein one said contact is located in a dielectric chamber formed in an annulus in a peripheral portion of said second connector half.

3. The joined chamber connector of claim 2, further including a flexible tube fixed at one end thereof to said first connector half, and having one said contact attached to a free end of said tube, and wherein said flexible tube engages one said movable cover member so that when moved to a position opening the dielectric chamber of said first connector half, said flexible tube is deployed radially outwardly through said opening.

4. The joined chamber connector of claim 3, wherein said one end of said flexible tube is fixed to said first connector half so that when in a relaxed state, said flexible tube is deployed radially outwardly from said first connector half.

5. The joined chamber connector of claim 3, further including a flexible tube guide for maintaining alignment of said flexible tube during deployment thereof to a relaxed state.

6. The joined chamber connector of claim 1, wherein one movable member associated with said first connector half is moved as a result of abutment thereof by said second connector half.

7. The joined chamber connector of claim 6, wherein each said movable member is spring biased against movement thereof by the other connector half.

8. The joined chamber connector of claim 7, wherein each said spring comprises a coil spring.

9. The joined chamber connector of claim 1, wherein said movable members each comprise a cylindrical-shaped sleeve.

10. The joined chamber connector of claim 9, wherein during engagement of the connector halves, each cylindrical sleeve is sealed to the other connector half.

11. The joined chamber connector of claim 10, further including a dielectric passage in said second connector half that joins the dielectric chamber of said second connector half to the dielectric chamber of said first connector half in response to movement of said cylindrical sleeve by said plunger.

12. The joined chamber connector of claim 1, wherein said first connector half includes a plunger movable in response to engagement of the connector halves, for sealing with the moveable member of the second connector half, and moveable to force an external fluid out of said second connector half.

13. The joined chamber connector of claim 1, wherein said moveable member of said first connector half is movable in response to engagement with the second connector half to provide an opening in the dielectric chamber of said first connector half, and to join the dielectric chambers via a fluid passage port in said second connector half.

14. The joined chamber connector of claim 1, wherein said signal lines are adapted for carrying optical signals.

15. A joined chamber connector, comprising:
a connector plug, including,
a housing;
at least one said signal contact for coupling signals;
a chamber within said housing for containing said signal contact in a dielectric fluid;
a cover movable with respect to said housing, said cover being sealed to said housing when moved to a closed position sealing said chamber closed;
a connector receptacle, including
a housing;
at least one complimentary signal contact mateable with the signal contact of said connector plug;
a chamber within said connector receptacle housing for containing said complementary signal contact in a dielectric fluid;
a cover movable with respect to said connector receptacle housing, and being sealed thereto when moved to a closed position, thereby sealing said connector receptacle chamber closed; and
said connector plug being structured so that when coupled to said connector receptacle, said connector plug cover is moved to a position to open said connector plug chamber and said connector receptacle cover is moved to a position to open said connector receptacle chamber so that said chambers are joined as a common chamber, and whereby said signal contact and said complimentary signal contact are joined in said common chamber and remain in said dielectric fluid.

16. The joined chamber connector of claim 15, wherein said connector receptacle includes a central cavity adapted for holding an external fluid, and said connector plug includes a plunger for forcing at least a portion of said external fluid out of said connector receptacle during coupling of said connector plug and receptacle.

17. The joined chamber connector of claim 15, wherein said chambers are of substantially the same volume, before, during and after engagement of the connector plug and receptacle.

18. The joined chamber connector of claim 15, further including a flexible tube carrying a signal line attached to said connector plug, and structured to deploy radially outwardly during mating with said connector receptacle.

19. A joined chamber connector, comprising:
a connector plug half, including,
a housing having fixed therein an elongate plunger;
a cover sleeve sealed to said housing for telescopic movement therewith, said cover sleeve extending from said housing and being sealed to said plunger to thereby define a dielectric chamber internal to said housing;
a flexible tube fastened to said plunger in such a manner as to splay radially outwardly to a relaxed state, and engageable with said cover sleeve to deform said flexible tube radially inwardly when said cover sleeve is telescopically moved to a position in which said dielectric chamber is sealed, and allowing said flexible tube to splay radially outwardly as said cover sleeve is telescopically moved to a position to form an opening in said dielectric chamber;
a signal contact fastened at a free end of said flexible tube; and
a signal line coupled to said signal contact.

20. The joined chamber connector of claim 19, further including a plurality of flexible tubes and associated signal contacts arranged annularly around said plunger.

21. The joined chamber connector of claim 20, wherein at least one said signal contact carries electrical signals, and another said signal contact carries optical signals.

22. The joined chamber connector of claim 19, further including a flexible tube guide attached to said plunger to provide guidance of said flexible tube during radial splaying thereof.

23. The joined chamber connector of claim 19, further including a coil spring for biasing said cover sleeve to a position sealing said dielectric chamber closed.

24. A joined chamber connector, comprising:
a connector receptacle half, including,
a housing having at one end thereof a frontal portion for receiving a complementary connector half, and at an opposite end thereof an opening through which an external fluid can enter into a central cavity of the connector receptacle half;
said housing having formed therein an annular chamber encircling said central cavity, said annular chamber defining a dielectric chamber;
a signal contact fixed in said dielectric chamber; and
a cover sleeve telescopically movable within said housing from a first position sealing said dielectric chamber and said signal contact from said central cavity, and to a second position exposing said signal contact to said central cavity.

25. The joined chamber connector of claim 24, further including in combination a plunger adapted for plugging said central cavity and moving said cover sleeve.

26. The joined chamber connector of claim 25, wherein said plunger is adapted for forcing the external fluid out of said central cavity.

27. The joined chamber connector of claim 24, wherein said signal contact is supported within a bore that is formed at an angle with respect to an axial axis of said central cavity.

28. The joined chamber connector of claim 24, further including a dielectric passage between said dielectric chamber and said central cavity, said dielectric passage being sealed by said cover sleeve when said connector receptacle half is demated.

* * * * *

(12) EX PARTE REEXAMINATION CERTIFICATE (6864th)
United States Patent
Niekrasz

(10) Number: US 5,838,857 C1
(45) Certificate Issued: Jun. 9, 2009

(54) JOINED CHAMBER CONNECTOR

(75) Inventor: Edward J. Niekrasz, Bonita, CA (US)

(73) Assignee: Lockheed Martin Corporation, Bethesda, MD (US)

Reexamination Request:
No. 90/006,861, Nov. 14, 2003

Reexamination Certificate for:
Patent No.: 5,838,857
Issued: Nov. 17, 1998
Appl. No.: 08/826,705
Filed: Apr. 7, 1997

(51) Int. Cl.
*G02B 6/38* (2006.01)

(52) U.S. Cl. .............................. 385/56; 385/58; 385/60; 439/139; 439/201

(58) Field of Classification Search .......................... None
See application file for complete search history.

(56) References Cited

U.S. PATENT DOCUMENTS

| | | |
|---|---|---|
| 3,491,326 A | 1/1970 | Pfister et al. |
| 3,508,188 A | 4/1970 | Buck |
| 3,845,450 A | 10/1974 | Cole et al. |
| 4,373,767 A | 2/1983 | Cairnes |
| 4,411,491 A | 10/1983 | Larkin et al. |
| 4,606,603 A | 8/1986 | Cairns |
| 4,666,242 A | 5/1987 | Cairns |
| 4,696,540 A | 9/1987 | Adams et al. |
| 4,795,359 A | 1/1989 | Alcock et al. |
| 4,948,377 A | 8/1990 | Cairns |
| 5,194,012 A | 3/1993 | Cairns |
| 5,203,805 A | 4/1993 | Cairns |
| 5,685,727 A | 11/1997 | Cairns |

FOREIGN PATENT DOCUMENTS

| | | |
|---|---|---|
| EP | 0 538 089 A1 | 4/1993 |
| FR | 2 529 396 A | 6/1982 |
| GB | 2 264 201 A | 8/1993 |
| WO | PCT/US85/01879 | 4/1986 |

*Primary Examiner*—Quyen P Leung

(57) ABSTRACT

A connector plug half includes a telescopic cover sleeve which can be pushed by a connector receptacle half during mating to a receded position to thereby deploy radially outward one or more flexible tubes, each having at the ends thereof an optical contact. The telescoping movement opens a dielectric chamber in which the optical contacts are maintained. The connector receptacle half includes one or more optical receptacle contacts in a peripheral dielectric chamber. An internal cover sleeve is telescoped to a receded position in the connector receptacle during mating to thereby join the two dielectric chambers when the optical connection is made. The dielectric chambers remain free of contamination by fluid external to the connector halves.

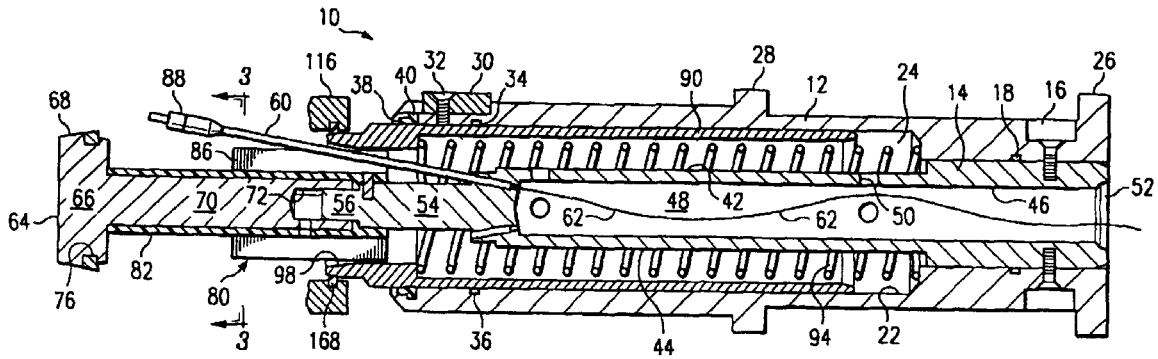

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19–28 is confirmed.

Claims 2, 9 and 16 are cancelled.

Claims 1, 3, 6, 7, 10, 12, 13, 15 and 18 are determined to be patentable as amended.

Claims 4, 5, 8, 11, 14 and 17, dependent on an amended claim, are determined to be patentable.

1. A joined chamber connector, comprising:
    a first connector half carrying a signal line, said first connector half being adapted for engaging with a second connector half carrying a signal line;
    a dielectric chamber housed within each said connector half, each said dielectric chamber having an opening sealed by a *compressibly* movable member;
    at least one pair of contacts, each contact being coupled to one said signal line and disposed in a dielectric chamber of a respective said connector half; and
    said connector halves being constructed such that when joined together, said movable members are moved so as to provide a fluid passage between said dielectric chambers, and said pair of contacts are mated in a dielectric fluid,
    *wherein one said contact is located in a dielectric chamber formed in an annulus in a peripheral portion of said second connector half.*

3. The joined chamber connector of claim [2] *1*, further including a flexible tube fixed at one end thereof to said first connector half, and having one said contact attached to a free end of said tube, and wherein said flexible tube engages one said *compressibly* movable cover member so that when moved to a position opening the dielectric chamber of said first connector half, said flexible tube is deployed radially outwardly through said opening.

6. The joined chamber connector of claim 1, wherein one *compressibly* movable member associated with said first connector half is moved as a result of abutment thereof by said second connector half.

7. The joined chamber connector of claim 6, wherein each said *compressibly* movable member is spring biased against movement thereof by the other connector half.

10. [The] *A* joined chamber connector [of claim 9], *comprising:*
    *a first connector half carrying a signal line, said first connector half being adapted for engaging with a second connector half carrying a signal line;*
    *a dielectric chamber housed within each said connector half, each said dielectric chamber having an opening sealed by a compressibly movable member;*
    *at least one pair of contacts, each contact being coupled to one said signal line and disposed in a dielectric chamber of a respective said connector half; and*
    *said connector halves being constructed such that when joined together, said movable members are moved so as to provide a fluid passage between said dielectric chambers, and said pair of contacts are mated in a dielectric fluid,*
    wherein said compressibly movable members each comprise a cylindrical-shaped sleeve, and
    wherein during engagement of the connector halves, each cylindrical sleeve is sealed to the other connector half.

12. [The] *A* joined chamber connector [of claim 1], *comprising:*
    *a first connector half carrying a signal line, said first connector half being adapted for engaging with a second connector half carrying a signal line;*
    *a dielectric chamber housed within each said connector half, each said dielectric chamber having an opening sealed by a compressibly movable member;*
    *at least one pair of contacts, each contact being coupled to one said signal line and disposed in a dielectric chamber of a respective said connector half; and*
    *said connector halves being constructed such that when joined together, said movable members are moved so as to provide a fluid passage between said dielectric chambers, and said pair of contacts are mated in a dielectric fluid,*
    wherein said first connector half includes a plunger *compressibly* movable in response to engagement of the connector halves, for sealing with the moveable member of the second connector half, and moveable to force an external fluid out said second connector half.

13. The joined chamber connector of claim 1, wherein said *compressibly* moveable member of said first connector half is movable in response to engagement with the second connector half to provide an opening in the dielectric chamber of said first connector half, and to join the dielectric chambers via a fluid passage port in said second connector half.

15. A joined chamber connector, comprising:
    a connector plug, including,
        a housing;
        at least one said signal contact for coupling signals;
        a chamber within said housing for containing said signal contact in a dielectric fluid;
        a cover *compressibly* movable with respect to said housing, said cover being sealed to said housing when moved to a closed position sealing said chamber closed;
    a connector receptacle, including
        a housing;
        at least one complimentary signal contact mateable with the signal contact of said connector plug;
        a chamber within said connector receptacle housing for containing said complementary signal contact in a dielectric fluid;
        a cover *compressibly* movable with respect to said connector receptacle housing, and being sealed thereto when moved to a closed position, thereby sealing said connector receptacle chamber closed; and
    said connector plug being structured so that when coupled to said connector receptacle, said connector plug cover is moved to a position to open said connector plug chamber and said connector receptacle cover is moved to a position to open said connector receptacle chamber so that said chambers are joined as a common chamber, and whereby said signal contact and said complimentary signal contact are joined in said common chamber and remain in said dielectric fluid,

*wherein said connector receptacle includes a central cavity adapted for holding an external fluid, and said connector plug includes a plunger for forcing at least a portion of said external fluid out of said connector receptacle during coupling of said connector plug and receptacle.*

18. [The] *A* joined chamber connector [of claim 15]*, comprising:*

*a connector plug, including,*
*a housing;*
*at least one said signal contact for coupling signals;*
*a chamber within said housing for containing said signal contact in a dielectric fluid;*
*a cover compressibly movable with respect to said housing, said cover being sealed to said housing when moved to a closed position sealing said chamber closed;*

*a connector receptacle, including*
*a housing;*
*at least one complimentary signal contact mateable with signal contact of said connector plug;*

*a chamber within said connector receptacle housing for containing said complementary signal contact in a dielectric fluid;*
*a cover compressibly movable with respect to said connector receptacle housing, and being sealed thereto when moved to a closed position, thereby sealing said connector receptacle chamber closed; and*

*said connector plug being structured so that when coupled to said connector receptacle, said connector plug cover is moved to a position to open said connector plug chamber and said connector receptacle cover is moved to a position to open said connector receptacle chamber so that said chambers are joined as a common chamber, and whereby said signal contact and said complimentary signal contact are joined in said common chamber and remain in said dielectric fluid,* further including a flexible tube carrying a signal line attached to said connector plug, and structured to deploy radially outwardly during mating with said connector receptacle.

\* \* \* \* \*